United States Patent [19]

Licus

[11] Patent Number: 4,971,645
[45] Date of Patent: Nov. 20, 1990

[54] METHOD OF FULLY CUSHIONING PULL STRAP HANDLE

[75] Inventor: John J. Licus, Sterling Heights, Mich.

[73] Assignee: Voplex Corporation, Troy, Mich.

[21] Appl. No.: 400,886

[22] Filed: Aug. 30, 1989

[51] Int. Cl.⁵ .............................................. B32B 31/20
[52] U.S. Cl. ................................ 156/213; 16/110 R; 16/DIG. 12; 156/215; 156/217; 156/219; 156/272.2; 156/274.4; 156/380.2; 156/380.8; 156/250; 156/244.12
[58] Field of Search ................ 16/DIG. 12, DIG. 24, 16/110 R, 116 R; 156/213, 272.2, 274.4, 379.7, 380.2, 380.8, 380.4, 215, 217, 219, 244.12, 250

[56] References Cited

U.S. PATENT DOCUMENTS

| | | | |
|---|---|---|---|
| 2,466,719 | 4/1949 | MacKearnin | 16/DIG. 12 |
| 3,470,814 | 10/1969 | Tschappu | 156/308.4 |
| 3,736,621 | 6/1973 | Szabo | 16/116 R |
| 3,749,622 | 7/1973 | Sato et al. | 156/157 |
| 3,826,702 | 7/1974 | Chapman | 156/215 |
| 3,829,341 | 8/1974 | Rothestein et al. | 156/308.8 |
| 3,952,383 | 4/1976 | Moore et al. | 24/265 R |
| 3,977,054 | 8/1976 | Moore et al. | 24/265 R |
| 4,025,375 | 5/1977 | Leasure | 156/272.2 |
| 4,174,988 | 11/1979 | Moore et al. | 156/213 |

OTHER PUBLICATIONS

Drawings (2 sheets) of strap handle made by extrusion process described in specification.

Primary Examiner—Robert A. Dawson
Assistant Examiner—Michele K. Yoder
Attorney, Agent, or Firm—Stonebraker, Shepard & Stephens

[57] ABSTRACT

A pull strap handle (10) for an automotive interior is fully cushioned by forming a foamed resin cushion (20) that is fit around and over both faces of a strap (15) for the handle. A backing bar (30) is then positioned to extend over cushion (20) and be spaced from strap (15), and a resin cover (25) is wrapped over the cushion and over backing bar (30) so that edges of the cover overlap adjacent the backing bar. Then a dielectric bonding bar (31) presses the overlapping edges of cover (25) against the metal backing bar so that the cover edges are dielectrically bonded together in a seam that preferably has the same surface texture pattern as the rest of the cover material, so as to be inconspicuous. Then backing bar (30) is slid endwise out from under cover (25), to leave the seam (32) spaced from strap (15) by the thickness of cushion (20) which can extend all around and over both faces of the strap. Handle (10) is then completed by forming the strap and providing end anchorages, as is generally known.

9 Claims, 3 Drawing Sheets

METHOD OF FULLY CUSHIONING PULL STRAP HANDLE

BACKGROUND

Pull strap handles, used in automotive interiors, have been made with a steel strap that provides the necessary tensile strength and a padded cover that conceals the strap. Such handles have included a foamed resin cushion under a dielectrically seamed cover, giving the handle a soft side engaged by the fingers and a firm side decorated with a trim strip concealing the cover seam.

Automotive pull strap handles have also been fully cushioned with a foamed resin padding material surrounding both faces of the strap inside a cover that is seamed inconspicuously along the length of the handle. Pull strap handles made this way have involved extruding the foamed cushion onto an indefinite length of steel strap, while wrapping and seaming the cover around the foam extrusion. The covered strap is then cut to handle lengths, formed into handle shapes, and stripped clear of foam and cover at end regions where anchorages are applied.

The continuous extrusion method of making fully padded strap handles requires a large equipment investment. A very expensive extrusion machine can then make such handles rapidly and economically to supply a large market for a particular style of handle. Smaller production runs that do not merit such a large investment in extruding equipment have been limited to dielectrically bonded covers for pull strap handles that are cushioned on only one side.

I have found a way of making fully cushioned pull strap handles with dielectrically bonded covers. My method does not require an expensive extrusion machine and is suitable for smaller production runs. It thus affords a fully cushioned strap handle that can be made at a low cost without a large initial investment.

SUMMARY OF THE INVENTION

My method of fully cushioning a pull strap handle involves forming a foamed resin cushion to fit around and over both faces of a strap for the handle and positioning a length of the cushion to enclose a length of the strap. I then position a backing bar to extend over the cushion and be spaced from the strap by the thickness of the cushion. Then I wrap a resin cover over the cushion and over the backing bar so that edges of the cover overlap adjacent the backing bar. Then by pressing a dielectric bonding bar against the overlapping cover edges supported by the backing bar, I dielectrically bond the cover edges together in a seam. To make the seam inconspicuous, I pattern the dielectric bonding bar with a texture resembling the surface pattern of the exterior of the cover. Then I slide the backing bar out of the strap handle to leave the seam spaced from the strap by the thickness of the cushion.

DRAWINGS

FIGS. 1–6 schematically show successive steps in my method of fully cushioning a strap handle, such steps including forming a foamed resin cushion (FIG. 1), wrapping the cushion around a strap and adhering it in place (FIG. 2), positioning a backing bar over the cushion (FIG. 3), wrapping a resin cover over the cushion and the backing bar (FIG. 4), bonding the overlapped edges of the cover (FIG. 5), and removing the backing bar from the handle (FIG. 6).

FIG. 7 is a partially cutaway, perspective view of the fully cushioned handle of FIG. 6.

DETAILED DESCRIPTION

Figure 6:
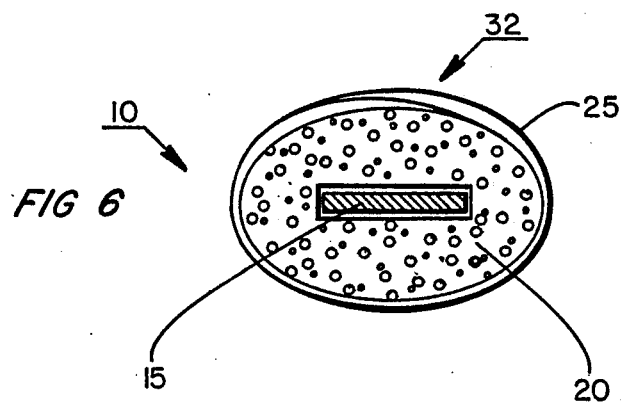
Figure 7:
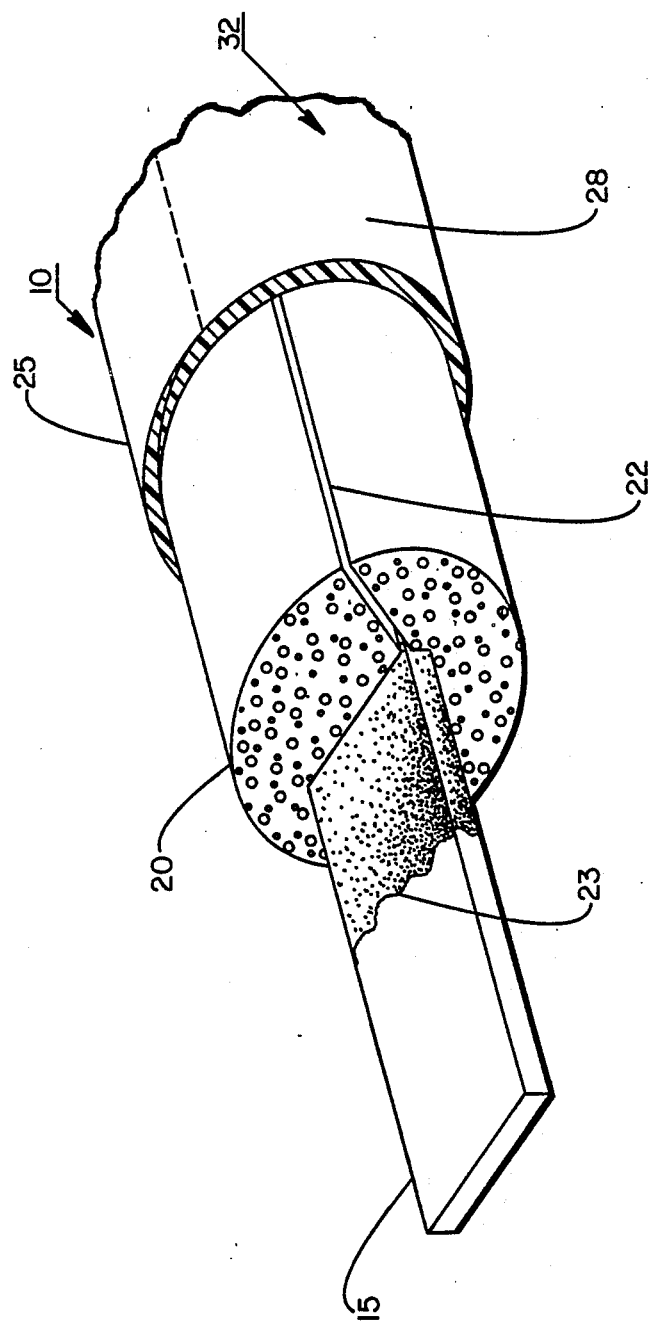

Pull strap handle 10, as shown in FIG. 7, includes a steel tensile strap 15, a foamed resin cushion 20, and a resin cover 25. The way these elements are assembled is shown in FIGS. 1–6.

Figure 1:
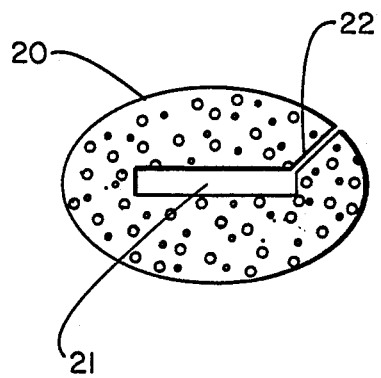
Figure 2:
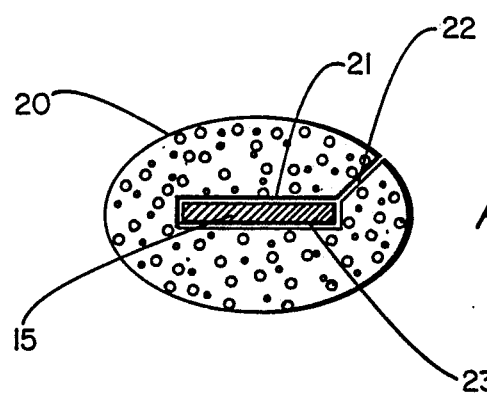

Cushion 20, as shown in FIG. 1, is preferably extruded of a foamed resin material in a generally oval or elliptical cross-sectional shape as illustrated, so as to wrap entirely around steel strap 15. A central cavity 21 is preferably formed to receive strap 15, and a slit 22 extends from the exterior of cushion 20 inward to cavity 21 so that cushion 20 can be opened at slit 22 and laterally wrapped around strap 15. This step is shown in FIG. 2, where I prefer adding adhesive 23 to bond cover 20 to strap 15.

I also prefer that strap 15 be cut to handle length before it is wrapped and encircled with cushion 20, which is preferably shorter than strap 15, to leave strap ends exposed for anchorages. After strap 15 is enclosed by cushion 20 and covered by cover 25, it is formed into the desired handle shape and provided with suitable end anchorages.

Figure 3:
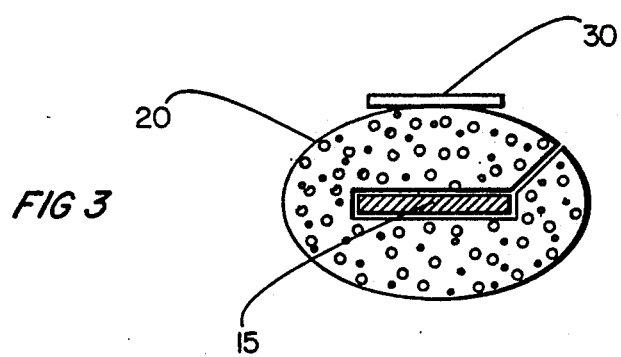
Figure 4:
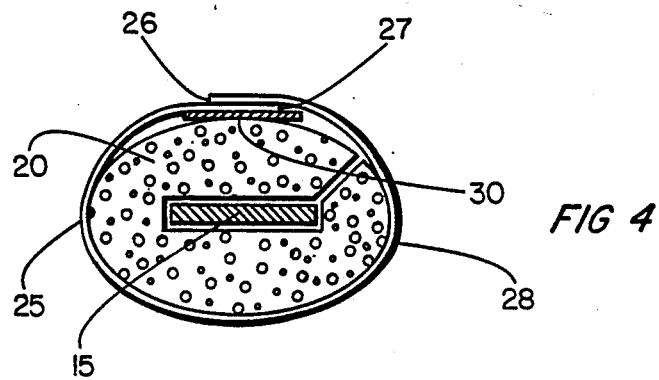

Before enclosing cushion 20 within cover 25, I first position backing bar 30 over a surface of cushion 20, as shown in FIG. 3. Backing bar 30 is preferably formed of steel and is about the size and shape of a hacksaw blade. It is spaced from strap 15 by the thickness of cushion 20.

I then wrap cover 25 around and over cushion 20 and over backing bar 30 so that lateral edges 26 and 27 of cover 25 overlap adjacent backing bar 30. Cover 25 is preferably formed of resin material such as polyvinyl chloride and preferably, but not necessarily, has an outer surface 28 that is patterned in a leather-like texture. A fixture (not shown) holds cover 25 in the wrapped position illustrated in FIG. 4.

Figure 5:
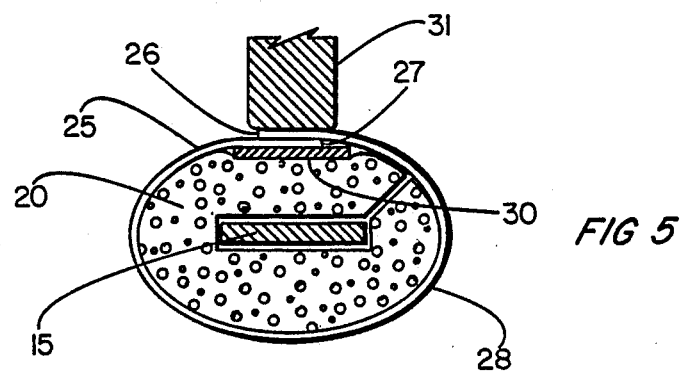

I then dielectrically bond the overlapping edges 26 and 27 of cover 25 by pressing them against backing bar 30 with a dielectric bonding bar 31, as shown in FIG. 5. I prefer that the surface of dielectric bonding bar 31 that presses against outer edge 26 of cover 25 have a texture pattern similar to the one used for cover surface 28 so that the resulting seam 32 is made inconspicuous. The presence of a metal backing bar 30 on the inside of overlapped cover edges 26 and 27 allows the dielectric bond for seam 32 to be made at a distance from strap 15.

After seam 32 is bonded in overlapping edges 26 and 27, I remove backing bar 30 by sliding it endwise out from under cover 25, to leave the strap handle shown in FIGS. 6 and 7. Backing bar 30 can be reused for the next strap handle, where its presence again allows a cover seam 32 to be spaced by the thickness of cushion 20 from strap 15. Covered handle 10 is then ready to be formed into its final shape and provided with end anchorages for installation in an automotive interior.

I claim:

1. A method of forming a seam in a fully cushioned, soft feel strap handle, said method comprising:
    a. arranging a hard metallic backing bar between the outside of a foamed resin cushion encircling a strap for said handle and the inside of overlapped edges of a resin cover wrapped around said cushion so that edges of said cover overlap each other over said backing bar, said overlapped cover edges being spaced from said strap by the thickness of said cushion;

b. dielectrically bonding together said overlapping edges of said cover by using a dielectric bonding bar pressing said cover edges against said backing bar to form said seam; and c. after forming said seam, sliding said backing bar out from under said seam, to leave said seam spaced from said strap by the thickness of said cushion, and to give said strap handle a soft feel provided by said cushion without said hard metallic backing bar being present underneath said seam.

2. The method of claim 1 including patterning said dielectric bonding bar in a pattern that machines an outer surface pattern of said cover so that said seam is inconspicuous.

3. The method of claim 1 including extruding said cushion in a shape that fits around and over both faces and both edges of said strap and has a generally elliptical cross-sectional profile, and including longitudinally slitting said cushion so that said cushion can wrap laterally around said strap.

4. The method of claim 1 including adhering said cushion to said strap before wrapping said cover around said cushion.

5. A method of fully cushioning a pull strap handle, said method comprising:

a. forming a foamed resin cushion to fit around and over both faces of a strap for said handle and positioning a length of said cushion to enclose a length of said strap;

b. positioning a hard metallic backing bar to extend over said cushion and be spaced from said strap;

c. wrapping a resin cover over said cushion and over said backing bar so that edges of said cover overlap each other adjacent said backing bar and are spaced from said strap by the thickness of said cushion;

d. using a dielectric bonding bar to press said overlapping cover edges against said backing bar for bonding said cover edges together in a seam; and e. after forming said seam, sliding said backing bar out of said strap handle to leave said seam spaced from said strap by the thickness of said cushion, and to give said strap handle a soft feel provided by said cushion without said hard metallic backing bar being present underneath said seam.

6. The method of claim 5 including patterning said dielectric bonding bar in a pattern that matches an outer surface pattern of said cover so that said seam is inconspicuous.

7. The method of claim 5 including adhering said cushion to said strap before wrapping said cover around said cushion.

8. The method of claim 5 including extruding said cushion in a shape that fits around and over both faces and both edges of said strap and has a generally elliptical cross-sectional profile.

9. The method of claim 8 including longitudinally slitting said cushion so that said cushion can wrap laterally around said strap.

* * * * *